United States Patent [19]
Hilton

[11] Patent Number: 5,494,070
[45] Date of Patent: *Feb. 27, 1996

[54] METERING VALVE WITH ADJUSTABLE FLOATING PISTON AND PIN ASSEMBLY

[75] Inventor: Thomas J. Hilton, Kirkland, Wash.

[73] Assignee: A & H Enterprises, Inc., Kirkland, Wash.

[ * ] Notice: The term of this patent shall not extend beyond the expiration date of Pat. No. 5,427,139.

[21] Appl. No.: 436,963

[22] Filed: May 8, 1995

Related U.S. Application Data

[63] Continuation of Ser. No. 239,232, May 6, 1994, Pat. No. 5,427,139.

[51] Int. Cl.$^6$ ..................................................... G05D 7/01
[52] U.S. Cl. ........................................................... 137/504
[58] Field of Search ...................................... 137/500, 501, 137/503, 504

[56] References Cited

U.S. PATENT DOCUMENTS

| | | | |
|---|---|---|---|
| 2,149,673 | 3/1939 | Godfrey | 137/504 X |
| 2,623,331 | 12/1952 | Greening | 137/501 |
| 2,704,553 | 3/1955 | Vertevil | 137/504 X |
| 5,301,713 | 4/1994 | Skoglund | 137/504 |

*Primary Examiner*—Robert G. Nilson
*Attorney, Agent, or Firm*—Christensen O'Connor Johnson & Kindness

[57] ABSTRACT

An adjustable metering valve (10) includes an upper housing (12) and lower housing (16) that cooperatively define an internal valve chamber (30) having an inlet end (80) and an outlet end (42). An inlet port (20) opens into the inlet end of the valve chamber, and an outlet port (24) provides for fluid flow exiting the outlet end (42) of the valve chamber. A floating piston (106) is slidably mounted within the valve chamber between the inlet and outlet ports. A seal (114) is provided between the piston and an interior side wall (44) of the valve chamber to prevent fluid flow past the piston except through an internal passage (118) through the piston. A valve seat (38) is mounted in the housing within the outlet end of the valve chamber, upstream of the outlet port. A valve pin (36) is carried by a pin assembly (34) that is threaded into the internal passage of the piston. The career assembly is threadably advanceable within the internal passage of the piston to adjust the position of the valve pin relative to the valve seat to open, close, and adjust the rate of fluid flow through the valve. A rotatable valve shaft (28) having a keyed end (97) that is slidably engaged within a correspondingly keyed passage (140) formed in the pin assembly is provided for advancement of the pin assembly to adjust the rate of fluid flow through the valve chamber.

8 Claims, 5 Drawing Sheets

1

METERING VALVE WITH ADJUSTABLE FLOATING PISTON AND PIN ASSEMBLY

This is a continuation of the prior application Ser. No. 08/239,232, filed on May 6, 1994, now U.S. Pat. No. 5,427,139, the benefit of the filing date of which are hereby claimed under 35 U.S.C. §120.

FIELD OF THE INVENTION

The present invention relates to fluid transfer and metering, and particularly to adjustable valves for controlling the rate of fluid flow.

BACKGROUND OF THE INVENTION

Many types of equipment and industrial processes require accurate control of the flow of liquid and gaseous fluids over a broad range of fluid pressure and flow rates. It is particularly important that flow controllers for such equipment and processes be able to accurately meter fluid flow at low flow rates. One conventional type of flow rate controller utilizes a floating piston that moves within a valve chamber under fluid pressure to mate a valve pin earned by the piston with a valve seat. Such floating piston flow controllers are designed to provide a constant flow rate despite fluctuations in the pressure of the fluid being supplied to the controller. The theory of floating piston flow control devices is self set in U.S. Pat. No. 4,893,649 to Skoglund, the disclosure of which is hereby incorporated by reference. The Skoglund device includes a piston that carries a centrally mounted pin and also includes a radially offset longitudinal passage through the piston to permit fluid flow through the valve chamber. The pin mates with a valve seat that is adjustably positioned at one end of the valve chamber by an adjustable shaft. The shaft can be manually operated to move the valve seat relative to the piston for adjustment of flow control.

Devices such as that disclosed in the Skoglund '649 patent have certain disadvantages. Because both the piston and the valve seat assembly are slidably mounted within the valve assembly, seals are required on both the piston and the valve seat. The number of parts required increases the cost of manufacture and assembly of the valves, and each seal represents a potential for failure that could adversely affect the performance of the valve. Additionally, because the flow passage through the piston is radially offset, there is a potential for the piston, and thus the valve pin, to become cocked as the result of a pressure imbalance on the piston. This is particularly true when cavitation occurs during shut-off of flow. When the pin is cocked relative to the valve seat, flow shut-off is incomplete and leakage through the valve will occur.

Another drawback of conventional floating piston valve controllers such as that disclosed by Skoglund '649 is that the amount of torque required to adjust the valve by repositioning the valve seat increases proportionally to fluid pressure within the valve. This is because the fluid pressure is operating in the valve seat components that must be rotated. As a result, adjustment can be difficult to accomplish at high pressures.

SUMMARY OF THE INVENTION

The present invention provides an adjustable flow control valve for controlling flow of a fluid from a fluid supply. The flow control valve includes a housing defining an internal valve chamber having a first end and a second end. The housing further defines an inlet port opening into the first end of the valve chamber for placing the fluid supply in fluid communication with the valve chamber, and an outlet port providing for fluid flow exiting from the second end of the waive chamber. A floating piston is slidably mounted within the valve chamber between the inlet and outlet ports. The piston defines an internal passage permitting fluid flow through the piston from the first end to the second end of the valve chamber. A valve seat is included in the housing in the second end of the valve chamber, upstream of the outlet port. A valve member is mounted to and carried by the floating piston. The valve member is selectively positionable relative to the piston and to the valve seat between a closed position, wherein the valve member blocks the valve seat to prevent fluid flow through the outlet port, and an open position, wherein the valve member is spaced from the valve seat to permit fluid flow through the outlet port. The flow control valve also includes a manually adjustable shaft for selectively positioning the valve member during operation of the valve to adjust the rate of fluid flow.

In a further aspect of the present invention, an adjustable flow control valve includes a housing defining an inlet port opening into a first end of a valve chamber and an outlet port opening from a second end of the valve chamber. A floating piston is slidably mounted within the valve chamber between the inlet and outlet ports, the piston defining an internal passage permitting fluid flow through the piston from the first end to the second end of the valve chamber. An adjustable valve is included within the housing, and includes a first valve member mounted within the internal passage of the piston for selective advancement within the internal passage relative to the piston. A cooperative second valve member is mounted within the housing in the second end of the valve chamber. Advancement of the first valve member within the piston determines the position of the first valve member relative to the second valve member to control the rate of flow of fluid through the valve chamber. A rotatable valve shaft has a work end external of the housing and an engaging end passing through the housing into the first end of the valve chamber. The engaging end of the valve shaft is slidably engaged with an elongate engaging surface defined by the first valve member. Selective rotation of the valve shaft causes advancement of the first valve member within the internal passage of the piston to adjust the rate of flow of fluid through the valve chamber.

In a still further aspect of the present invention, an adjustable flow control valve includes a housing defining an internal valve chamber having a first end and a second end, an inlet port opening into the first end of the valve chamber for placing a fluid supply in fluid communication with the valve chamber, and an outlet port for fluid flow from the second end of the valve chamber. The valve further includes a floating piston slidably mounted within the valve chamber between the inlet and outlet ports. The piston defines an internal passage permitting fluid flow through the piston from the first end to the second end of the valve chamber. A seal is mounted between the piston and inner wall of the valve chamber to prevent fluid flow past the piston except through the internal passage. In a preferred embodiment, the internal passage is centrally aligned along a longitudinal axis defined by the piston. A valve seat is included in the housing in the second end of the valve chamber, upstream of the outlet port. The valve also includes a valve pin and a carrier member threadably engaged within the internal passage of the piston. The valve pin is carried by the carrier member, and thus is part of the piston assembly. The carrier member is threadably advanceable within the internal passage of the piston to adjust the position of the valve pin relative to the valve seat between a closed position and a full open position. A rotatable valve shaft has a work end external of the housing and an engaging end passing through the housing into the first end of the valve chamber. The engaging end of the valve shaft is slidably engaged with an elongate engaging surface defined by the carrier member. Selective rotation of the valve shaft causes advancement of the career member within the internal passage of the piston, and thus changes the position of the valve pin relative to the valve seat, to adjust the rate of fluid flow through the valve chamber.

The present invention provides an adjustable flow control valve that is operable to accurately meter fluid flow across a broad range of flow rates. Because of the central disposition of the internal passage of the piston and the valve pin and seat, the pin is resistant to becoming cocked and misaligned during valve shut-off. Thus, accuracy of flow at very low rates and prevention of leakage upon shut-off is provided. A guide is also included in a preferred embodiment of the valve to further ensure that the pin retains its alignment relative to the valve seat. Because the valve seat is stationary within the valve, with only the valve pin and piston assembly being adjustable, the cost of manufacture and assembly is reduced relative to conventional floating piston controllers.

An additional advantage of the present invention is that the valve is easily adjusted by applying torque to the valve shaft at a level that is constant over a broad range of operating pressures. Because pressure is applied to both sides of the valve pin assembly carried by the floating piston, fluid pressure does not need to be overcome in order to rotate the pin assembly with the value shaft.

BRIEF DESCRIPTION OF THE DRAWINGS

The present invention will be better understood by reference to the following detailed description, when taken in conjunction with the accompanying drawings, wherein.

DETAILED DESCRIPTION OF THE PREFERRED EMBODIMENT

Figure 1:
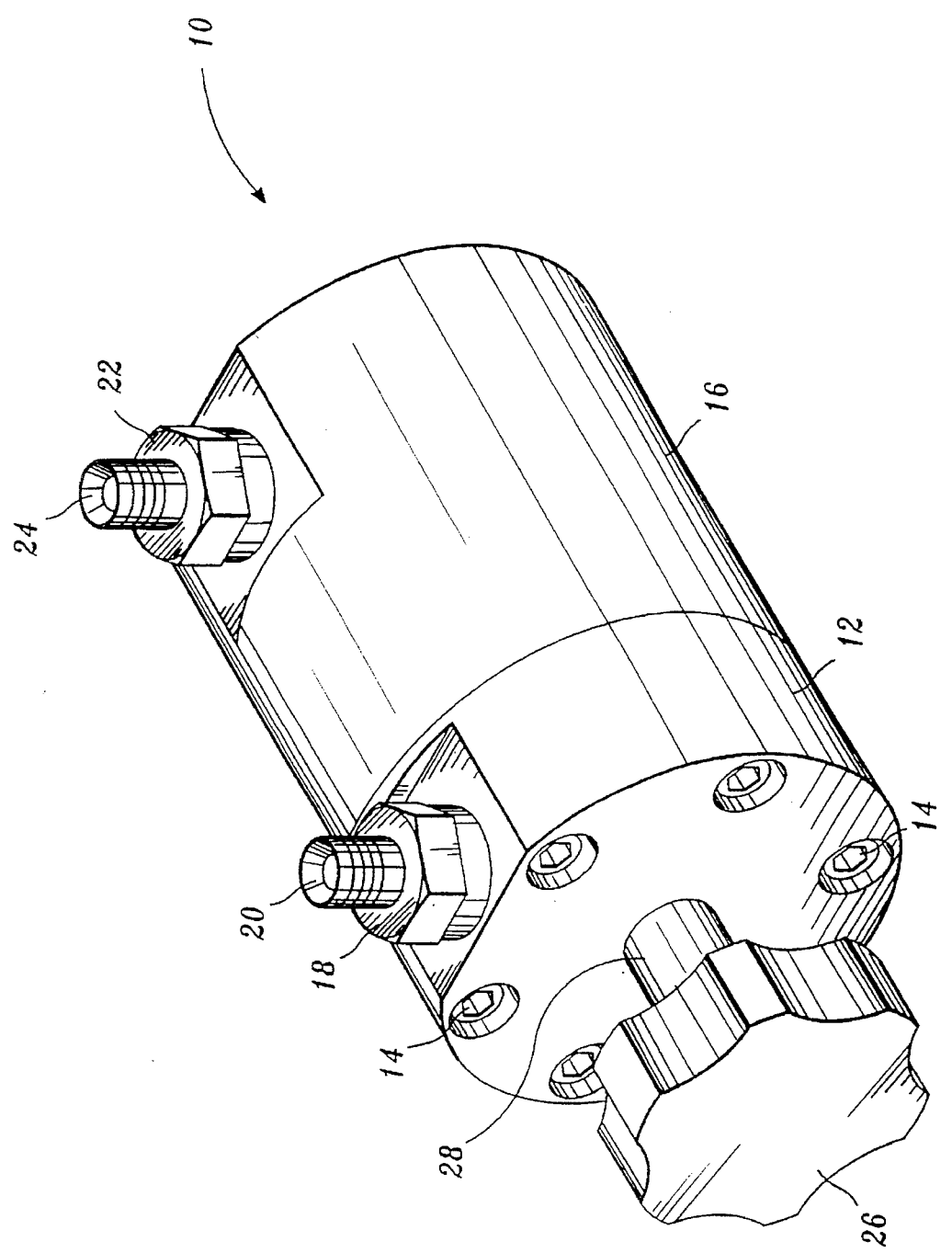
FIG. 1 provides an isometric view of an adjustable flow control valve constructed in accordance with the present invention.

An adjustable flow control valve 10 constructed in accordance with the present invention is shown in FIG. 1. The valve 10 includes an upper housing 12 secured by a plurality of bolts 14 to a lower housing 16. The upper housing 12 is provided with an inlet fitting 18 allowing connection of a fluid supply (not shown) to an inlet port 20, while an outlet fitting 22 is provided in the lower housing 16 and provides for fluid flow from an outlet port 24. The valve 26 further includes a manually operable knob 26 secured to a rotatable adjustment shaft 28 that opens through the upper housing 12 into the interior of the valve.

As used herein throughout, the terms "lower" and "bottom" refer to the end of the valve 10 closest in proximity to the outlet port 24, while the terms "upper" and "top" refer to the opposite end of the valve closest to the inlet port 20. These identifiers are used for convenience in aid of understanding the disclosures contained herein; however, it should be apparent to those skilled in the art that the valve 10 can be used in any physical orientation.

Figure 2:
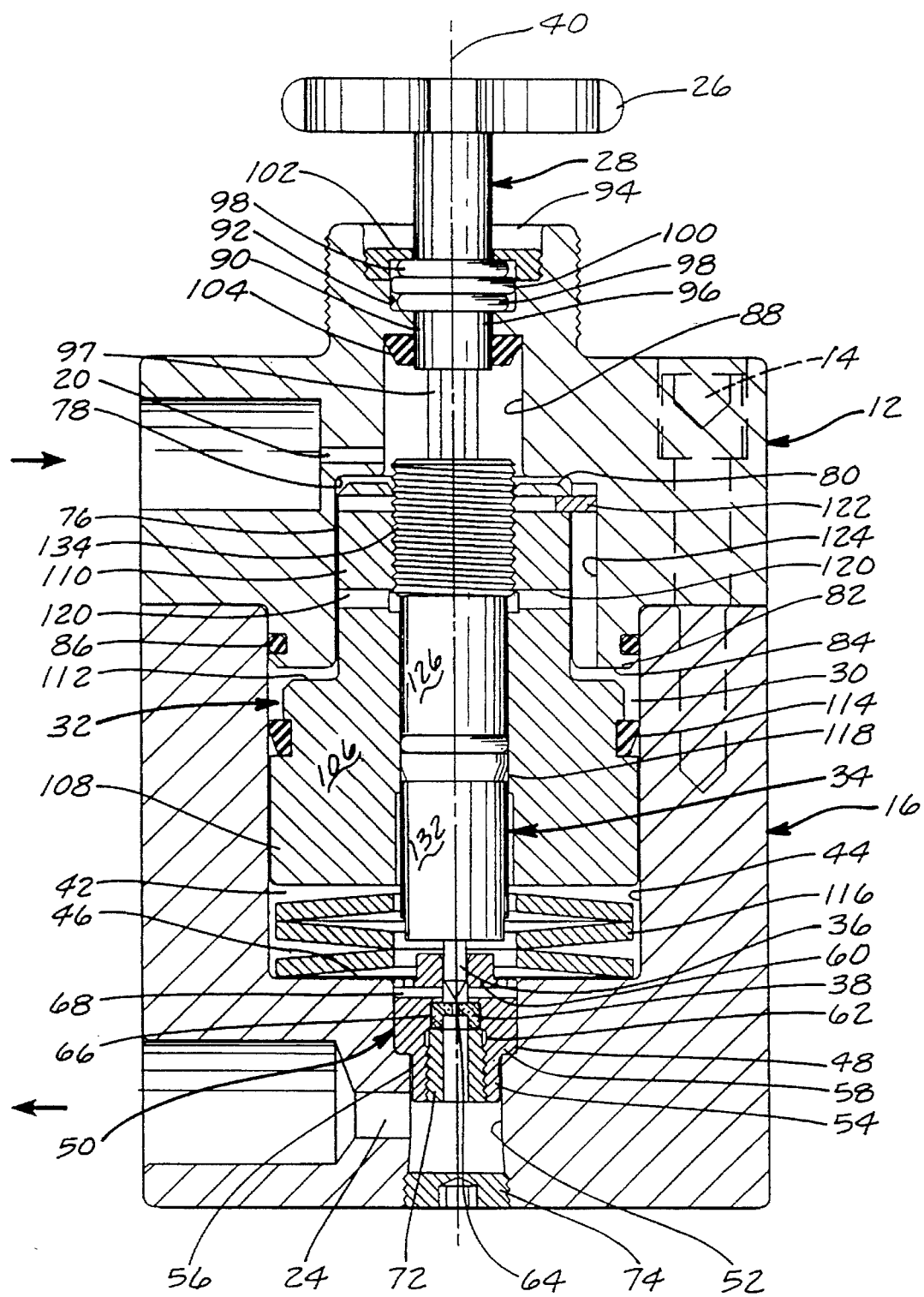
FIG. 2 illustrates the adjustable flow control valve of FIG. 1 in cross section taken substantially along a plane intersecting the longitudinal axis of the valve, except that the adjustment shaft and pin assembly are not sectioned.

Referring now to FIG. 2, the upper housing 12 and lower housing 16 cooperatively define an internal valve chamber 30 into which the inlet port 20 and outlet port 24 open. The valve 10 includes a floating piston assembly 32 that is slidably disposed within the valve chamber 30 between the inlet port 20 and outlet port 24. The floating piston assembly includes an internal threadably mounted pin assembly 34 that carries a valve pin 36 that projects from the floating piston assembly 32 toward the outlet port 24. The valve pin 36 mates with a valve seat 38. The pin assembly 34 is advanceable within the floating piston assembly 32 by rotation of the valve shaft 28 to adjust the gap between the valve pin 36 and the valve seat 38 thus controlling the rate of fluid flow through the valve 10.

Referring still to FIG. 2, the construction of the upper housing 12 and lower housing 16 shall now be described in greater detail. The valve chamber 30 of the valve 10 has a cylindrical configuration. The valve chamber 30, valve shaft 28, all components of the floating piston assembly 32 including the, pin assembly 34 and the valve pin 36, and the valve seat 38 are aligned along a common longitudinal axis 40. The lower housing 16 is bored to from the outlet end 42 of the valve chamber 30, defined by an interior side wall 44 and interior bottom wall 46 of the lower housing 16. A recess 48 is formed centrally in the interior bottom wall 46 and receives a valve seat assembly 50. A narrower bore 52 opens from the recess 48 to the exterior of the lower housing 16. The outlet port 24 opens axially into the bore 52 below the valve seat assembly 50.

The valve seat assembly 50 includes a seat holder 54 that is dimensioned to fit snugly within the recess 48. The seat holder 54 has an internally threaded annular lower portion 56 that is received within the bore 52, a central body portion 58 that is received within the recess 48, and an upper annular pin guide; portion 60 that projects above the plane of the interior bottom wall 46 into the outlet end 42 of the valve chamber 30. A seal (not shown) is installed around the central body portion 58 of the seat holder 54 and seals against the recess 48 of the lower housing 16.

A central bore 62 is formed longitudinally through the lower annular portion 56 and central body portion 58 of the seat holder 54. The valve seat 38 is inserted within the central bore 62 in the central body portion 58 of the seat holder 54. The valve seat 38 is shaped as an upside-down cylindrical cup, and includes a narrow, centrally formed outlet orifice 64 aligned along the longitudinal axis 40 of the valve 10.

A pin guide bore 66 is formed longitudinally downwardly through the pin guide portion 60 of the seat holder 54. The pin guide bore 66 is smaller in diameter than the central bore 62 formed through the central body portion 58 of the seat holder 54, and exposes the upper center face portion of the valve seat 38 and the outlet orifice 64. The pin guide bore 66 is dimensioned just slightly larger than the diameter of the valve pin 36, and guides the valve pin 36 in its approach to the valve seat 38. This ensures that the valve pin 36 remains in alignment along the longitudinal axis 40 of the valve and thus relative to the valve seat 38 to prevent incomplete closure of the valve during flow shut-off.

To provide for further fluid flow to the valve seat 38, two narrow, diametrically opposed passages 68 are formed radially through the central body portion 58 of the seat holder 54, opening into the pin guide bore 66 just above the valve seat 38. Two longitudinal passages 70 are formed downwardly from the upper surface of the central body portion 58 and open into the radial passages 68, thus providing for fluid flow from the top surface or the seat holder 54 to the pin guide bore 66 and thus the outlet orifice 64.

The valve seat 38 is retained within the seat holder 54 by a threaded tubular retainer 72 that is threaded into the central bore 62 of the seat holder 54 behind the valve seat 38. A fluid flow path thus exists through the radial passages 68 of the seat holder 54, the outlet orifice 64 of the valve seat 38, the tubular retainer 72 within the central bore 62 of the seat holder 54, the bore 52 of the lower housing 16 and to the outlet port 24. The end of the bore 52 in the lower housing 16 is sealed below the outlet port 24 by a threaded plug 74 that carries a seal (not shown).

The upper housing 12 forms an internal cylindrical cavity having an interior side wall 76 and interior top wall 78. This cavity within the upper housing 12 forms the inlet end 80 of the valve chamber 30. The diameter of the interior side wall 76 is less than the diameter of the interior side wall 44 of the lower housing 16. The face of the upper housing 12 forms an annular flange portion 82 that is received within the interior side wall 44 of the lower housing 16. The flange portion 82 defines on its bottom face a shoulder 84. A seal 86 such as an O-ring seal is received within a groove formed about the flange portion 82 to seal the upper housing 12 to the lower housing 16.

A cylindrical central recess 88 is formed centrally in the interior top wall 78 of the upper housing 12. The inlet port 20 of the upper housing 12 opens into the internal recess 88 and thus into the inlet end 80 of the valve chamber 30. A longitudinal bore 90 opens from the central recess 88 into an external recess 92 formed downwardly and centrally into the exterior of the top surface of the upper housing 12. A larger threaded retainer recess 94 is formed about the exterior recess 92.

The valve shaft 28 has an upper portion 96 that passes through the bore 90 in the upper housing 12 and a hexagonally keyed lower portion 97 that extends into the valve chamber 30. The lower portion 97 of the valve shaft 28 is hexagonally keyed for engagement with the pin assembly 34, as shall be described subsequently. Two seals 98, such as O-ring seals, are mounted on the upper portion 96 of the valve shaft 28 on either side of an annular retainer flange 100 formed about this portion of the valve shaft 28. The retainer flange 100 and seals 98 are received within the exterior recess 92 of the upper housing 12, and are backed by a threaded retainer ring 102 that is threaded into the retainer recess 94. An additional seal 104 is received on the valve shaft 28 within the top of the internal recess 88 of the upper housing 12, and further seals the valve shaft 28 to prevent leakage from the valve chamber 30. The knob 26 is secured to the uppermost end of the valve shaft 28.

The floating piston assembly 32 includes a floating piston 106 having a lower portion 108 that is dimensioned to be slidably received within the outlet end 42 of the valve chamber 30 and an upper portion 110 of narrower diameter that is dimensioned to be slidably received within the inlet end 80 of the valve chamber 30. The outside diametrical surface of the floating piston 106 defines a shoulder 112 between the lower portion 108 and upper portion 110. A seal 114 is received within an annular groove formed about the lower portion 108 of the floating piston 106, and wipes the interior side wall 44 of the lower housing 16. It should be readily apparent to those skilled in the art that various types of seals 114 can be utilized, including O-ring seals, cupped-spring seals, or a flexible diaphragm secured between the floating piston 106 and either the lower housing 16 and upper housing 12. The seal 114 functions to prevent fluid flow past the outside diameter of the floating piston 106.

The floating piston 106 slides under the influence of fluid pressure within the valve chamber 30. A stack of frusto-conical spring washers 116 is received within the outlet end 42 of the valve chamber 30 between the interior bottom wall 46 of the lower housing 16 and the floating piston 106. The interior opening of the spring washers 116 is sufficient to provide clearance for the lower end of the pin assembly 34. The purpose of the spring washers 116 is to bias the floating piston upwardly within the valve chamber 30 toward the inlet end 80 of the valve chamber 30. While a stack of three spring washers 116 is illustrated in FIG. 2, it should be readily apparent to those skilled in the art that a single or differing number of spring washers could be utilized, and that alternate types of springs or bias devices could be alternately employed, such as a coil spring.

When fluid pressure is applied to the floating piston 106 through the inlet port 20, the floating piston 106 is pushed downwardly to compress the spring washers 116, thereby carrying the valve pin 36 closer to the valve seat 38. The degree of slidable movement downward of the floating piston 106 within the valve chamber 30 is proportional to the fluid pressure applied to the floating piston 106. As is well-known in the art for floating pistons, this feature enables the valve 10 to operate over a range of fluid pressures while still providing a constant fluid flow rate. Higher pressures result in more movement of the floating piston 106, and thus a decrease in the gap between the valve pin 36 and valve seat 38, while lower pressures result in a larger gap. By selecting a spring with an appropriate spring constant, an increase in fluid pressure is balanced by a proportionally increased pressure drop through the resulting decreased gap between the valve pin 36 and valve seat 38.

The floating piston 106 includes an internal passage 118 formed centrally through the floating piston 106 and aligned along the longitudinal axis 40 of the valve 10. The internal passage 118 provides for fluid flow through the floating piston 106 from the inlet end 80 to the outlet end 42 of the valve chamber 30, and also provides for mounting of the pin assembly 34. A longitudinally spaced pair of radial passages 120 are formed diametrically through the upper portion 110 of the floating piston 106, opening into the internal passage 118. A pin 122 is press fit into one end of the uppermost radial passage 120, and projects radially from the upper portion 110 of the floating piston 106. The protruding end of the pin 122 is slidably received within an elongate slot 124 formed longitudinally in the interior side wall 76 of the upper housing 12. The pin 122 slides within the slot 124 during movement of the floating piston 106, and prevents rotation of the floating piston 106 relative to the upper housing 12. The opposite end of the uppermost radial passage 120, and both ends of the lowermost radial passage 120 provide for additional fluid flow into the internal passage 118 of the piston from the inlet end 80 of the valve chamber 30.

Figure 3:
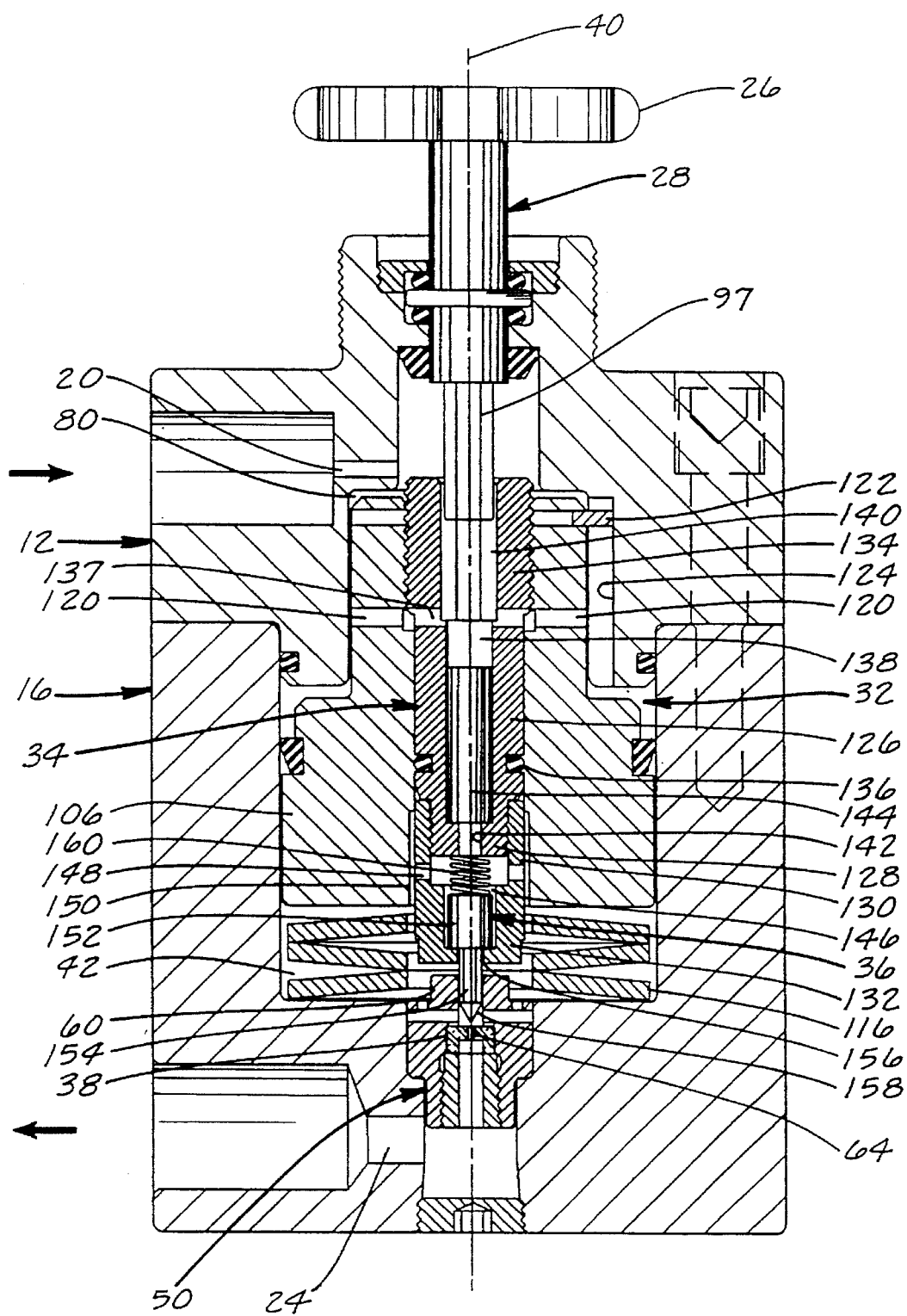
FIG. 3 provides a cross-sectional view of the valve of FIG. 1, as viewed in FIG. 2, but with the slider and pin retainer of the pin assembly also being shown in section, while the pin, pin bias spring and orifice assembly (shown schematically) are not shown in section, and with no fluid pressure applied to the valve.

Referring to FIGS. 2 and 3, the pin assembly 34 is received within the internal passage 118 of the floating piston 106. The pin assembly 34 is assembled from a tubular slider sleeve 126 having a turned-down externally threaded lower end 128 that is threadably received within the internally threaded upper end 130 of a pin earner sleeve 132. The slider sleeve 126 has an externally threaded upper end 134 that is threaded into an internally threaded upper portion of the internal passage 118 of the floating piston 106. A seal 136 such as an O-ring seal is received in an annular groove formed about the slider sleeve 126 that seals against the interior of the internal passage 118 in the floating piston 106 to prevent fluid flow past the exterior of the slider sleeve 126 through the floating piston 106. A radial passage 137 is formed diametrically through the slider sleeve 126 below the upper end 134, and permits fluid flow from the radial passages 120 in the piston 106 into the interior of the slider sleeve 126.

Referring to FIG. 3, the slider sleeve 126 defines a central passage 138 having a hexagonally keyed upper portion 140 that slidably receives the hexagonally keyed lower portion 97 of the valve shaft 28. The diameter of the hexagonally keyed lower portion 97 of the valve shaft 28 and upper portion 140 of the central passage 138 of the slider sleeve 126 are selected so that rotation of the valve shaft 28 results in rotation of the slider sleeve 126, while providing enough clearance that fluid can flow past the lower portion 97 of the valve shaft 28 into the central passage 138. The central passage 138 of the slider sleeve 126 terminates at the lower end of the slider sleeve 126 into a narrow passage 142 formed centrally in the lower face of the slider sleeve 126.

An orifice structure 144 is received within the bottom of the central passage 138, below the hexagonally keyed upper portion 140. The orifice structure 144 permits fluid flow through the central passage 138 and into the pin carrier sleeve 132. The orifice structure 144 is selected to provide for a desired degree of pressure drop through the floating piston 106. One suitable type of orifice structure 144, which is shown schematically in FIG. 3, is a tortured path orifice sold by the Lee Company of Westbrook, Conn. A tortured path orifice provides a tortuous fluid flow path with resultant fluid pressure drop but is resistant to clogging from particulates contained in the fluid stream. Other suitable types of orifice structures 144 may be employed, such as a venturi orifice. Likewise, in some instances it may be desirable to eliminate the orifice structure 144 to reduce the pressure drop through the valve 10. The valve 10 can be reconfigured by replacing the orifice structure 144 with an orifice structure providing a different degree of pressure drop to reconfigure the valve 10 for different usage conditions. The valve 10 described and disclosed herein has been found effective at metering fluid flow at rates ranging from slightly greater than zero to 1200 gallons per day, and more particularly from a low flow rate of one-half liter per day to 1200 gallons per day when operating at 3,000 psi fluid pressure. These flow rates are obtained using an orifice structure 144 that is selected to provide a 100-pound differential pressure through the valve. It should be readily apparent to those of skill in the art that the valve 10 can be alternately configured for differing selected flow rate ranges, including higher flow rate ranges.

The pin carrier sleeve 132 has a generally tubular shape with a closed bottom face through which the valve pin 36 projects, and defines an internal cavity 146. A radial passage 148 is formed diametrically through the pin earthier sleeve 132 below its threaded upper end 130, and provides for fluid flow to exit the cavity 146 and pass into the outlet end 42 of the valve chamber 30. To facilitate this flow, there is an annular space 150 defined between the pin carrier sleeve 132 and the internal passage 118 of the floating piston 106. Fluid passes from the internal passage 118 of the floating piston 106, through the orifice structure 144, and then into the outlet end 42 of the valve chamber 30. A continuous fluid flow pathway through the floating piston 106 is thus provided.

The valve pin 36 has a head portion 152 that is received within the internal cavity 146 of the pin carrier sleeve 132, and a narrower stem portion 154 that projects through an exit passage 156 formed centrally through the bottom face of the pin carrier sleeve 132 into the outlet end 42 of the valve chamber 30. The cylindrical stem portion 154 is slidably received within the pin guide portion 60 of the seat holder 54. A pointed tip 158 of the stem portion 154 is aligned with the outlet orifice 64 of the valve seat 38.

A coil spring 160 is received within the cavity 146 of the pin carrier sleeve 132 between the head portion 152 of the valve pin 36 and the bottom end of the slider sleeve 126. The coil spring 160 biases the valve pin 36 downwardly toward the valve seat 38, but provides for upward movement of the valve pin 36 within the internal cavity 146 of the pin carrier sleeve 132 upon sudden impact of the valve pin 36 with the valve seat 38. This prevents breakage and extends wear of the valve pin 36.

The valve pin 36 and valve seat 38 are preferably selected of a wear-resistant material to extend the life of these components of the valve 10. Suitable materials include ceramics. Other materials such as hardened steels may be employed, as is well-known by those of skill in the art.

The valve pin 36 is mounted within the floating piston 106 by the pin carrier sleeve 132 and slider sleeve 126. This pin assembly 34 thus moves together with the floating piston 106. Movement of the floating piston assembly 32 upwardly and downwardly within the valve chamber 30 draws the valve pin 36 away from and toward the valve seat 38, increasing and decreasing the gap between the valve seat 38 and valve pin 36 correspondingly. This provides for a constant fluid flow rate despite changes in fluid pressure. However, if it is desired to change the fluid flow rate, the position of the valve pin 36 relative to the floating piston 106, and thus relative to the valve seat 38 at any given pressure can be adjusted by threadably advancing or retracting the pin assembly 34 within the floating piston 106.

Figure 4:
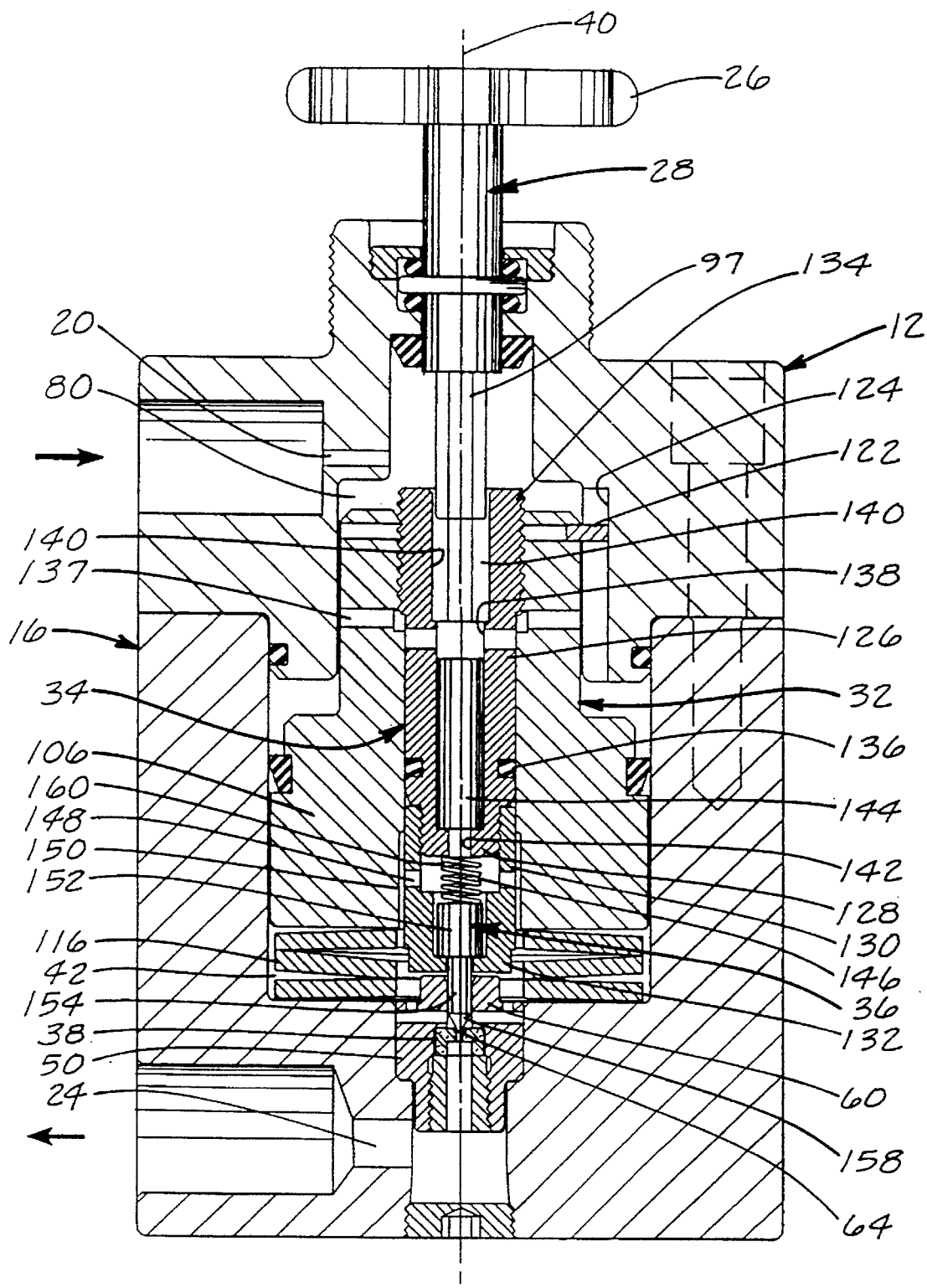
FIG. 4 provides a cross-sectional view of the valve of FIG. 1 as viewed in FIG. 3, but with fluid pressure applied to the valve and the valve pin adjusted to the closed configuration to prevent flow through the valve.
Figure 5:
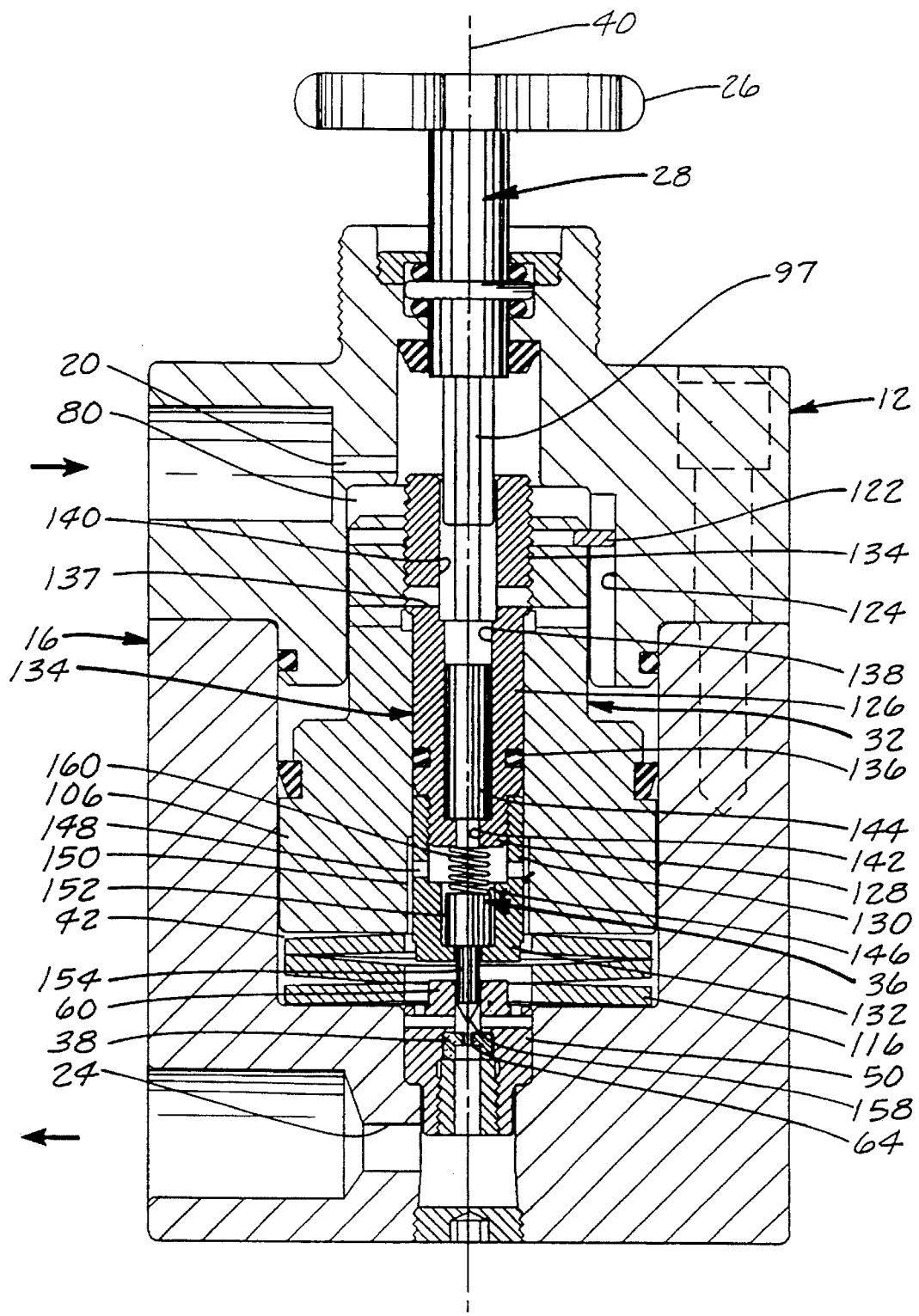
FIG. 5 illustrates a cross-sectional view of the valve of FIG. 1 as viewed in FIG. 4 with fluid pressure applied to the valve and the pin valve adjusted to the open configuration to permit fluid flow through the valve.

The operation of the valve 10 is best understood in reference to FIGS. 3–5. The valve 10 is shown in FIG. 3 when no fluid pressure is applied to the valve 10. The spring washers 116 bias the floating piston assembly 32 upwardly within the valve chamber 30. A gap exists between the tip 158 of the valve pin 36 and the valve seat 38. When fluid pressure is applied to the valve 10, the floating piston assembly 32 moves downwardly as a result of the applied fluid pressure within the valve chamber 30, as shown in FIG. 4. The spring washers 116 are compressed. In FIG. 4, the pin assembly 34 is illustrated threaded fully inwardly within the floating piston 106, so that the valve pin 36 contacts the valve seat 38, blocking fluid flow through the outlet orifice 64. Thus, no flow is permitted through the valve 10. During movement of the floating piston assembly 32 upwardly and downwardly within the valve chamber 30, the slider sleeve 126 slides over the lower portion 97 of the valve shaft 28.

To open the valve 10, the valve shall 28 is turned by rotating the knob 26, which correspondingly drives rotation of the slider sleeve 126, and thus the entire pin assembly 34 within the floating piston 106. The floating piston 106 is maintained stationary due to the interaction of the pin 122 in the groove 124, thus causing pin assembly 34 to move longitudinally upward relative to the floating piston 106 within the internal passage 118 of the floating piston 106. This longitudinal advancement of the pin assembly 34 within the floating piston 106 withdraws the valve pin 36 from the valve seat 38, as shown in FIG. 5. A gap now exists between the valve pin 36 and the valve seat 38, permitting fluid flow through the outlet orifice 64. The valve seat 38 remains stationary in a static position during this adjustment. During operation of the valve, if it is desired to further increase or decrease the flow rate of fluid through the valve 10, the shaft 28 is turned to longitudinally advance upwards or retract downwards the pin assembly 34 within the floating piston 106, thus increasing or decreasing the gap between the valve pin 36 and valve seat 38.

Thus adjustment of the fluid flow rate through the valve 10 is made by adjusting the effective length and shape of the floating piston assembly 32 to achieve the desired positioning of the valve pin 36. Because this adjustment is carried out by threadably advancing a component of the floating piston assembly, i.e., the pin assembly 34, that is exposed to fluid pressure on both its upper and lower faces, the adjustment is easily made even under high fluid pressure with no increase in torque required to turn the valve shaft 28.

Because the internal passage 118 of the floating piston 106 and components contained therein are centrally disposed within the floating piston 106 along the longitudinal axis 40, no side-to-side imbalance is imparted on the floating piston 106 by fluid pressure. This provides for smooth movement of the floating piston 106 and prevents the floating piston 106 from becoming cocked during use. This is particularly important during shut-off of flow, because the valve pin 36 remains aligned relative to the valve seat 38. This alignment is further maintained due to the slidable interaction of the valve pin 36 within the pin guide portion 60 of the seat holder 54.

While the preferred embodiment of the invention has been illustrated and described, it will be appreciated that various changes can be made therein without departing from the spirit and scope of the invention. It is thus intended that the scope of letters patented granted hereon be defined only by the definitions contained in the following claims.

The embodiments of the invention in which an exclusive property or privilege is claimed are defined as follows:

1. An adjustable flow control valve for controlling flow of a fluid from a fluid supply, comprising:

(a) a housing defining an internal valve chamber having a first end and a second end, an inlet port opening into the first end of the valve chamber for placing the fluid supply in fluid communication with the valve chamber, and an outlet port for fluid flow to exit from the second end of the valve chamber;

(b) a floating piston slidably mounted within the valve chamber between the inlet and outlet ports, the piston defining a longitudinal axis and an internal passage aligned on the longitudinal axis permitting fluid flow through the piston from the first end to the second end of the valve chamber;

(c) a valve seat included in the housing in the second end of the valve chamber, upstream of the outlet port;

(d) a valve member carried by the floating piston and selectively positionable relative to the piston and to the valve seat between a closed position, wherein the valve member blocks the valve seat to prevent fluid flow through the outlet port, and an open position, wherein the valve member is spaced from the valve seat to permit fluid flow through the outlet port; and (e) means for selectively positioning the valve member relative to the piston during operation of the valve to adjust the rate of fluid flow.

2. The adjustable flow control valve of claim 1, wherein the valve member comprises a carrier member that is mounted within the floating piston and a valve pin that is carried by the carrier member.

3. The adjustable flow control valve of claim 1, wherein the valve member is threadably engaged within the floating piston.

4. The adjustable flow control valve of claim 3, wherein the valve member is threadably engaged within the internal passage of the floating piston.

5. The adjustable flow control valve of claim 1, wherein the valve member is mounted within the internal passage of the piston.

6. The adjustable flow control valve of claim 1, further comprising a seal mounted between the piston and an inner wall of the valve chamber to prevent fluid flow past the piston except through the internal passage.

7. The adjustable flow control valve of claim 1, further comprising a spring mounted within the second end of the valve chamber and biasing the piston toward the first end of the valve chamber, the spring being selected to be compressed when fluid pressure is applied to the inlet port of the housing to force the piston toward the second end of the valve chamber.

8. The adjustable flow control valve of claim 1, wherein the valve seat and valve member are aligned on the longitudinal axis of the floating piston.

* * * * *

UNITED STATES PATENT AND TRADEMARK OFFICE
CERTIFICATE OF CORRECTION

PATENT NO. : 5,494,070  Page 1 of 2
DATED : February 27, 1996
INVENTOR(S) : T.J. Hilton It is certified that error appears in the above-indentified patent and that said Letters Patent is hereby corrected as shown below:

| | | |
|---|---|---|
| [57]<br>Pg. 1, col. 2 | Abstract<br>(line 15 of text) | "career" should read --carrier-- |
| 1 | 23 | "earned" should read --carried-- |
| 1 | 27 | "self set" should read --set forth-- |
| 2 | 4 | "waive" should read --valve-- |
| 3 | 7 | "career" should read --carrier-- |
| 4 | 35 | "the, pin" should read --the pin-- |
| 4 | 37 | "from" should read --form-- |
| 4 | 50 | After "guide" delete --;-- |
| 5 | 16 | "surface or" should read --surface of-- |

UNITED STATES PATENT AND TRADEMARK OFFICE
CERTIFICATE OF CORRECTION

PATENT NO. : 5,494,070  Page 2 of 2
DATED : February 27, 1996
INVENTOR(S) : T.J. Hilton It is certified that error appears in the above-identified patent and that said Letters Patent is hereby corrected as shown below:

| COLUMN | LINE | ERROR |
|--------|------|-------|
| 5 | 62 | "shalt 28" should read --shaft 28-- |
| 5 | 63 | "shalt 28" should read --shaft 28-- |
| 5 | 65 | "shalt 28" should read --shaft 28-- |
| 7 | 8 | "earner" should read --carrier-- |
| 7 | 67 | "earthier" should read --carrier-- |
| 8 | 66 | "shall 28" should read --shaft 28-- |

Signed and Sealed this

Twenty-seventh Day of August, 1996

Attest:

BRUCE LEHMAN

Attesting Officer    Commissioner of Patents and Trademarks